(12) United States Patent
Edpalm et al.

(10) Patent No.: US 11,240,510 B2
(45) Date of Patent: Feb. 1, 2022

(54) BLURRING PRIVACY MASKS

(71) Applicant: Axis AB, Lund (SE)

(72) Inventors: Viktor Edpalm, Lund (SE); Song Yuan, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/947,654

(22) Filed: Aug. 11, 2020

(65) Prior Publication Data

US 2021/0092398 A1    Mar. 25, 2021

(30) Foreign Application Priority Data

Sep. 20, 2019  (EP) ..................................... 19198647

(51) Int. Cl.
*H04N 7/12* (2006.01)
*H04N 19/136* (2014.01)
*H04N 19/162* (2014.01)
*H04N 19/172* (2014.01)
*H04N 19/593* (2014.01)

(52) U.S. Cl.
CPC ......... *H04N 19/136* (2014.11); *H04N 19/162* (2014.11); *H04N 19/172* (2014.11); *H04N 19/593* (2014.11)

(58) Field of Classification Search
CPC .. H04N 19/136; H04N 19/593; H04N 19/162; H04N 19/172; H04N 19/176; H04N 19/103; H04N 19/124; H04N 19/157; H04N 19/167
USPC ..................................................... 375/240.02
See application file for complete search history.

(56) References Cited

U.S. PATENT DOCUMENTS

| | | | |
|---|---|---|---|
| 8,610,787 B2 | 12/2013 | Namba et al. | |
| 9,282,333 B2 | 3/2016 | Dutt et al. | |
| 2011/0085035 A1* | 4/2011 | Choi | H04N 19/159 348/143 |
| 2011/0235715 A1* | 9/2011 | Chien | H04N 19/14 375/240.16 |
| 2012/0236935 A1* | 9/2012 | Dutt | H04N 19/167 375/240.03 |
| 2015/0371014 A1 | 12/2015 | Raley et al. | |

(Continued)

OTHER PUBLICATIONS

European Search Report; European Patent Office. Application No. 19198647.0; Place of Search: Munich; Date of Completion of the Search: Feb. 27, 2020. pp. 1-8.

(Continued)

*Primary Examiner* — Gims S Philippe
(74) *Attorney, Agent, or Firm* — Mollborn Patents, Inc.; Fredrik Mollborn

(57) ABSTRACT

Methods and apparatus, including computer program products, implementing and using techniques for encoding a video sequence comprising a plurality of image frames, by an encoder are described. An image frame is received from a video stream. An input is received, which indicates one or more regions in the received image frame for which a privacy mask should be applied. The one or more regions are represented by one or more coding units. The image frame is encoded into an output frame, wherein image data in the one or more regions is replaced by intra-predicted coding units with transformed coefficients set to zero, the intra-predicted coding units are obtained from a prediction stage in the encoder.

11 Claims, 5 Drawing Sheets

(56) References Cited

U.S. PATENT DOCUMENTS

| | | | | |
|---|---|---|---|---|
| 2016/0150231 | A1* | 5/2016 | Schulze | H04N 19/132 |
| | | | | 375/240.12 |
| 2017/0094274 | A1* | 3/2017 | Chien | H04N 19/122 |
| 2018/0174414 | A1* | 6/2018 | Edpalm | H04N 19/117 |
| 2018/0176597 | A1 | 6/2018 | Edpalm et al. | |
| 2018/0324436 | A1* | 11/2018 | Danielsson Fan ... | H04N 19/114 |
| 2019/0020879 | A1 | 1/2019 | Lee et al. | |

OTHER PUBLICATIONS

Ruchaud Natacha et al: "JPEG-based scalable privacy protection and image data utility preservation", IET Signal Processing, The Institution of Engineering and Technology, Michael Faraday House, Six Hills Way, Stevenage, Herts. SGI 2AY, UK, vol. 12, No. 7, Sep. 1, 2018 (Sep. 1, 2018), pp. 381-887, XP006069336, ISSN: 1751-9675, DOI: 10.1049/IET-SPR.2017.0413.
Communication pursuant to Article 94(3) EPC. Application No. 19198 647.0-1208. European Patent Office, 80298 Munich, Germany, dated Aug. 10, 2020. pp. 5.

* cited by examiner

BLURRING PRIVACY MASKS

TECHNICAL FIELD

The present invention relates to video encoding, and more specifically, to encoding a video stream that includes one or more privacy masks.

BACKGROUND

Monitoring cameras are used in many different applications, both indoors and outdoors, for monitoring a variety of environments. Images depicting a captured scene may be monitored by, e.g., an operator or a guard. In certain situations, there may be a need to treat one part of a captured image differently from another part, such as when there is a need to exclude part of an image, for example, in the interest of personal integrity.

In such instances, an operator may define one or more privacy masks during set-up of the surveillance equipment. A privacy mask may be static or dynamic. Static privacy masks typically stay in place until the operator decides to move or remove them. Dynamic privacy masks may change over time, and the operator may also define when the privacy mask should be applied. For instance, the operator could define a dynamic privacy mask such that if a face is detected within the masked area, the face will be masked out, but otherwise no mask will be applied to the area.

Privacy masks are often applied to the image as an overlay. The privacy mask often has a polygonal shape, but other shapes are also possible, which more closely follow the shape of the area to occlude. Some privacy masks take the form of an opaque area (e.g. a uniformly black area), while other privacy masks take the form of blurring, where image data is "smeared" out over the privacy mask area, or pixilation. Pixilation is a process where a single pixel value (often an average value of several or all the pixels within a coding unit) replaces all the pixels in a coding unit. In general, though, blurring for privacy masking is considered more desirable than pixilation as it allows for smoother edges and is therefore nicer looking. However, blurring is more difficult to a achieve and requires more computational resources to implement than what is currently economically viable in a hardware block.

SUMMARY

It is an object of the present invention to provide techniques for encoding a video sequence having a plurality of image frames, which enables aesthetically pleasing privacy masks to be applied to the video, without any significant cost increase in terms of computer resources needed for the encoding. This and other objects are achieved by a method according to claim 1, an encoder system according to claim 7, and a computer program product according to claim 10.

According to a first aspect, these and other objects are achieved, in full or at least in part, by a method, in a computer system, for encoding a video sequence having a plurality of image frames. The method includes:

receiving an image frame from a video stream;
receiving an input indicating one or more regions in the received image frame for which a privacy mask should be applied, wherein the one or more regions are represented by one or more coding units;
encoding the image frame into an output frame, wherein image data in the one or more regions is replaced by intra-predicted coding units with transformed coefficients set to zero, the intra-predicted coding units being obtained from a prediction stage in the encoder.

This provides a way of using information that is available in a prediction stage of a video encoder, and use this information to create a blurred privacy mask that is much more aesthetically pleasing compared to conventional pixilated privacy masks. Furthermore, pixilation solutions typically have a maximum size limit so they will only support masking up to a certain portion of the image. Such a maximum size does not exist when using the techniques in accordance with the present invention. Using this method also allows the privacy mask to be created without requiring any significant amount of additional computational resources. In addition, perfect frame synchronization can be achieved and it can be guaranteed that the encoder does not alter the privacy mask in any way.

According to one embodiment the step of selecting a size of the coding units is performed automatically by the encoder. This allows the encoder to select its best trade-off between quality and bitrate.

According to one embodiment, the step of selecting a size of the coding units is done manually by a user. Being able to receive user input allows a user better control of the encoding, and ability to override any settings determined by the encoder. This may be especially useful under certain circumstances, such as fulfilling formal user requirements of a certain pixilation level, for example.

According to one embodiment, a size of the coding units is selected based on a desired blurriness level. Generally, bigger coding units provide more blurring. There may be situations, for example, where an object is located far away and is smaller. In such a situation, a smaller blurring may be desirable such that certain features of the object are still distinguishable, in contrast to a situation where you have a close-up view of an object and more blurring may be needed.

According to one embodiment the image data obtained from the prediction stage is image data obtained from an image frame that is output at the end of the prediction stage, and which image frame is used as a base image frame for a transformation stage of the encoder. Being able to tap into and use information that is already produced in a conventional encoding setting, rather than having to perform extra calculations, saves computational resources and also makes it possible to use conventional encoders without having to make any significant modifications. Conversely, conventional ("standard compliant") decoders can also be used for decoding the encoded video stream.

According to one embodiment, the one or more regions in the received image frame for which a privacy mask should be applied are automatically identified using object detection techniques. This may provide an efficient way of selecting large numbers of objects that are easy to identify, such as all license plates of a large number of cars in a parking lot, or any individuals wearing red jackets in an image, etc. In certain embodiments automatic selections can be made by object detection techniques, and then be verified by a human operator, which might allow beneficial synergy effects.

According to one embodiment, the video is encoded in one of the following formats: High Efficiency Image File Format, Advanced Video Coding, High Efficiency Video Coding, H.265, H.266, VP9, VP10 and AV1. That is, the methods in accordance with the invention can be applied to a range of standard encoding formats, and do therefore not need any special custom equipment for decoding.

According to a second aspect, the invention relates to an encoder system for encoding a video sequence having a plurality of image frames. The system includes a receiving module and an encoder. The receiving module is configured to: receive an image frame from a video stream, and to receiving an input indicating one or more regions in the received image frame for which a privacy mask should be applied, wherein the one or more regions are represented by one or more coding units. The encoder is configured to encode the image frame into an output frame, wherein image data in the one or more regions is replaced by intra-predicted coding units with transformed coefficients set to zero, the intra-predicted coding units being obtained from a prediction stage.

According to a third aspect, the invention relates to a computer program for encoding a video sequence having a plurality of image frames. The computer program contains instructions corresponding to the steps of:

receiving an image frame from a video stream;

receiving an input indicating one or more regions in the received image frame for which a privacy mask should be applied, wherein the one or more regions are represented by one or more coding units;

encoding the image frame into an output frame, wherein image data in the one or more regions is replaced by intra-predicted coding units with transformed coefficients set to zero, the intra-predicted coding units being obtained from a prediction stage in the encoder.

According to a fourth aspect, the invention relates to a digital storage medium comprising such a computer program. The computer program and the storage medium involve advantages corresponding to those of the method and may be varied similarly.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

Figure 1:
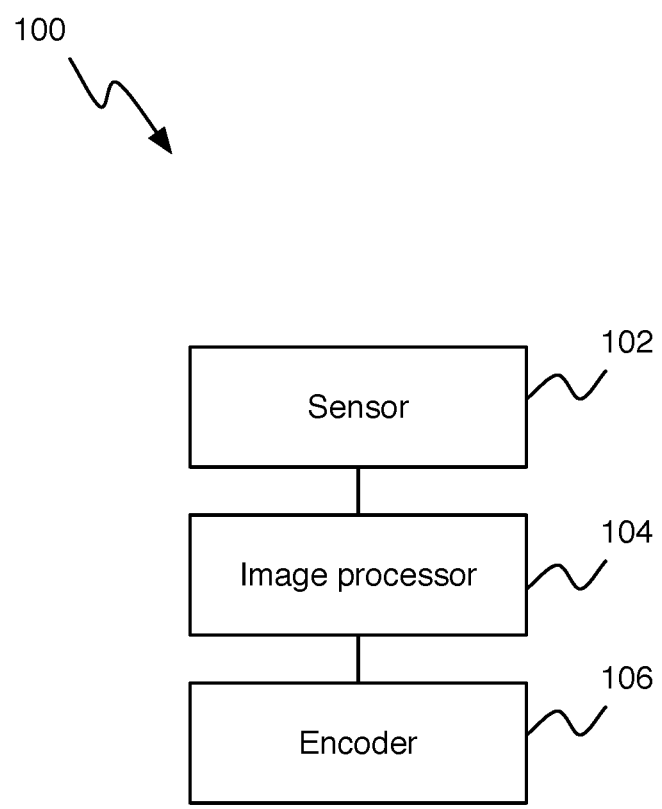
FIG. 1 shows a system for encoding a video sequence having a plurality of image frames, in accordance with one embodiment.

As was described above, one goal with the various embodiments of the current invention is to encode a video sequence having a plurality of image frames, in which at least some of the image frames should include a privacy mask, in more aesthetically pleasing way, through the use of blurring rather than pixilation, while at the same time not significantly increasing the need for computing resources.

Images captured by a monitoring camera are normally transmitted to a site of use, such as a control center, where the images may be viewed and/or stored. Alternatively, they can be stored in so-called "edge storage", i.e., storage at the camera, either on board the camera, such as on an SD-card, or in connection with the camera, such as on a NAS (network attached storage). Before transmission or edge storage, the images are typically encoded to save bandwidth and storage space. Encoding may be performed in many different ways, e.g., in accordance with the H.264, H.265 standards, or other encoding standards.

In many digital video encoding systems, two main modes are used for compressing video frames of a sequence of video frames: intra mode and inter mode. In the intra mode, the luminance and chrominance channels (or in some cases RGB or Bayer data) are encoded by exploiting the spatial redundancy of the pixels in a given channel of a single frame via prediction, transform, and entropy coding. The encoded frames are called intra-frames (also referred to as "I-frames"). Within an I-frame, blocks of pixels, also referred to as macro blocks, coding units or coding tree units, are encoded in intra-mode, that is, they are encoded with reference to a similar block within the same image frame, or raw coded with no reference at all.

In contrast, the inter mode exploits the temporal redundancy between separate frames, and relies on a motion-compensation prediction technique that predicts parts of a frame from one or more previous frames by encoding the motion in pixels from one frame to another for selected blocks of pixels. The encoded frames are referred to as inter-frames, P-frames (forward-predicted frames), which can refer to previous frames in decoding order, or B-frames (bi-directionally predicted frames), which can refer to two or more previously decoded frames, and can have any arbitrary display order relationship of the frames used for the prediction. Within an inter-frame, blocks of pixels may be encoded either in inter-mode, meaning that they are encoded with reference to a similar block in a previously decoded image, or in intra-mode, meaning that they are encoded with reference to a similar block within the same image frame, or raw-coded with no reference.

The encoded image frames are arranged in groups of pictures (GOPs). Each GOP is started by an I-frame, which does not refer to any other frame, and is followed by a number of inter-frames (i.e., P-frames or B-frames), which do refer to other frames. Image frames do not necessarily have to be encoded and decoded in the same order as they are captured or displayed. The only inherent limitation is that a frame that serves as a reference frame must be decoded before other frames, which use that frame as a reference can be encoded. In surveillance or monitoring applications, encoding is generally performed in real time, meaning that the most practical approach is to encode and decode the image frames in the same order as they are captured and displayed, as there will otherwise be undesired latency. The techniques in accordance with various embodiments of the invention will now be described by way of example and with reference to the figures.

FIG. 1 is a schematic block diagram illustrating a system 100 in which the image encoding techniques in accordance with the various embodiments can be implemented. The system 100 can be implemented, for example, in a monitoring camera that captures images (e.g., a video sequence) of a scene.

Figure 2:
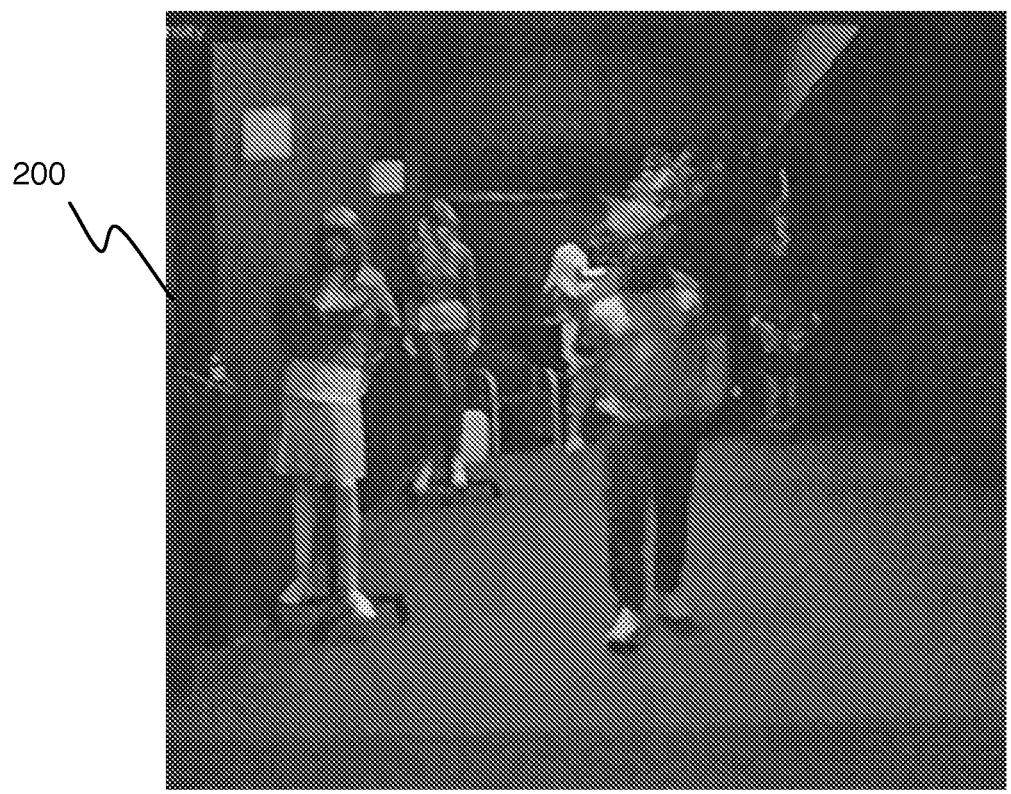
FIG. 2 shows an image of scene captured by a monitoring camera, in accordance with one embodiment.

FIG. 2 shows an image 200 of a scene captured by an image sensor 102 in the monitoring camera. In the image 200, there are several mannequins that, for purposes of illustration in this example embodiment, represent people whose identity should be concealed by applying privacy masks to their faces.

Figure 3:
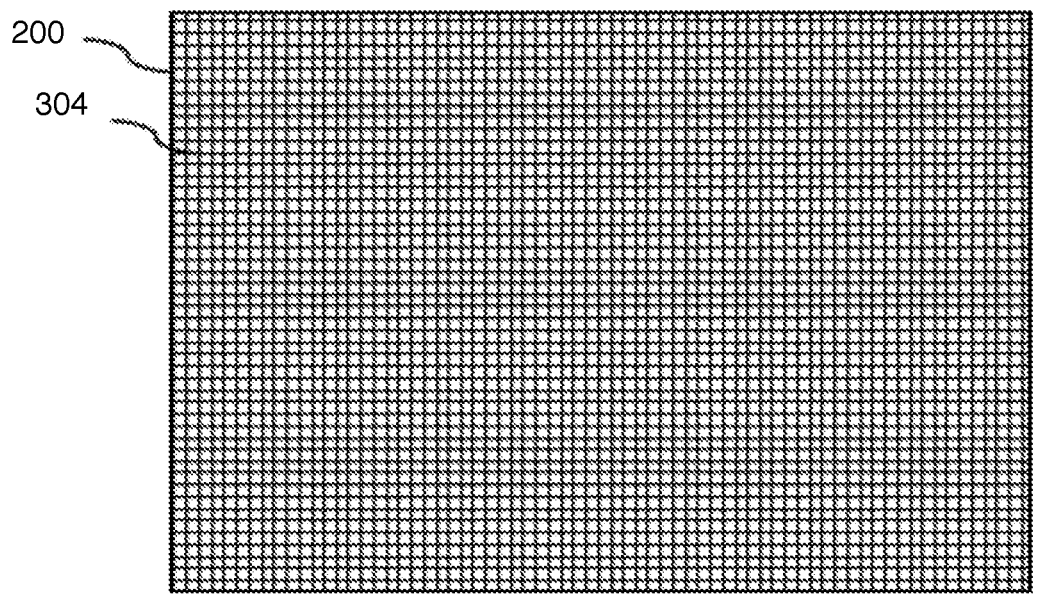
FIG. 3 shows a schematic example of a principal structure of an image captured by the camera in FIG. 2, in accordance with one embodiment.

FIG. 3 shows a principal structure of the image 200 as captured by the image sensor. The image 200 is made up of a number of pixels 304, corresponding to the pixels of the image sensor in the camera. The image may, for instance, be made up of 1280×720 pixels, 1920×1080 pixels, or 3840× 2160 pixels.

Figure 4:
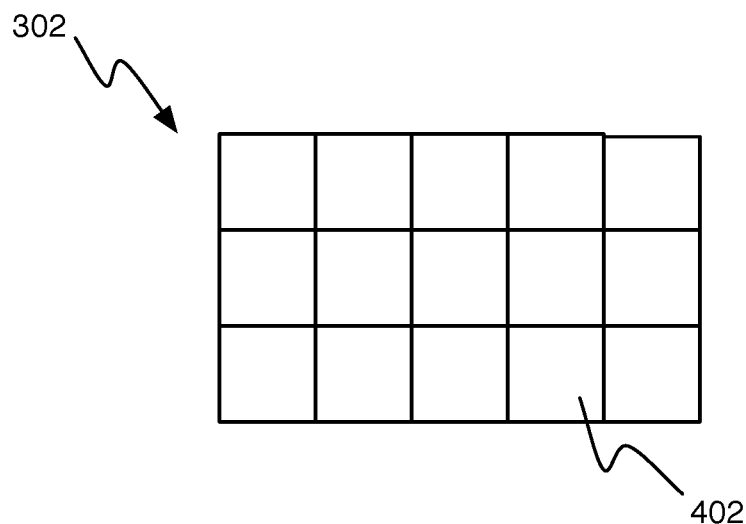
FIG. 4 shows a schematic example of a grouping pixels of the image in FIG. 3 into encoding units, in accordance with one embodiment.

The image captured by the sensor 102 is sent to an image processing unit 104, which processes the image. The processing of the image can include, for example, noise reduction, local tone mapping, spatial and temporal filtering, etc. For purposes of the various embodiments of the invention described herein, one important operation performed by the image processing unit 104 includes grouping the pixels 304 of the image 302 into encoding units 402 of neighboring pixels 304, as shown in FIG. 4. The encoding units 402 are also referred to as blocks, macroblocks, pixel blocks, coding tree units, or coding units.

Figure 6:
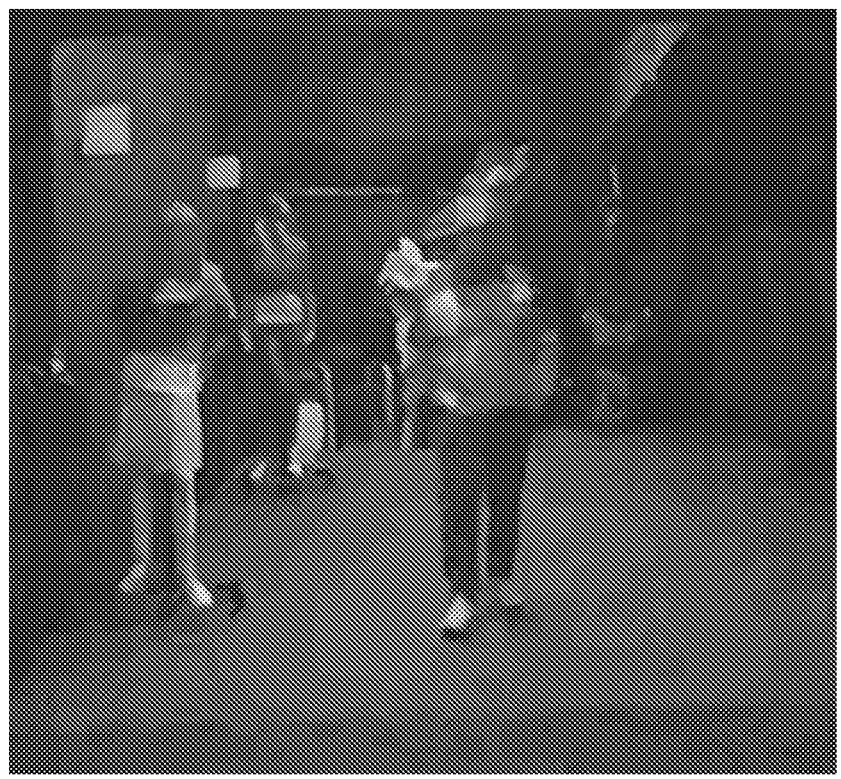
FIG. 6 shows the image captured by the camera in FIG. 2, with a privacy mask applied, in accordance with one embodiment.

An encoding unit 402 is typically square and made up of, e.g., 8×8, 15 16×16, or 32×32 pixels. However, it is also possible to group the pixels 304 into encoding units 402 of other sizes and shapes. It should be noted that the size of the encoding units 402 in FIG. 4 is exaggerated compared to the size of the pixels in FIG. 3, for purposes of illustration and explanation. In a real-life scenario, there would typically be a much larger number of encoding units 402 for the number of pixels 304 of FIG. 3. After processing by the image processing unit 104, the processed image is sent to the encoder 106. The operations of the encoder 106 will now be explained with reference to FIGS. 2, 5 and 6.

Figure 5:
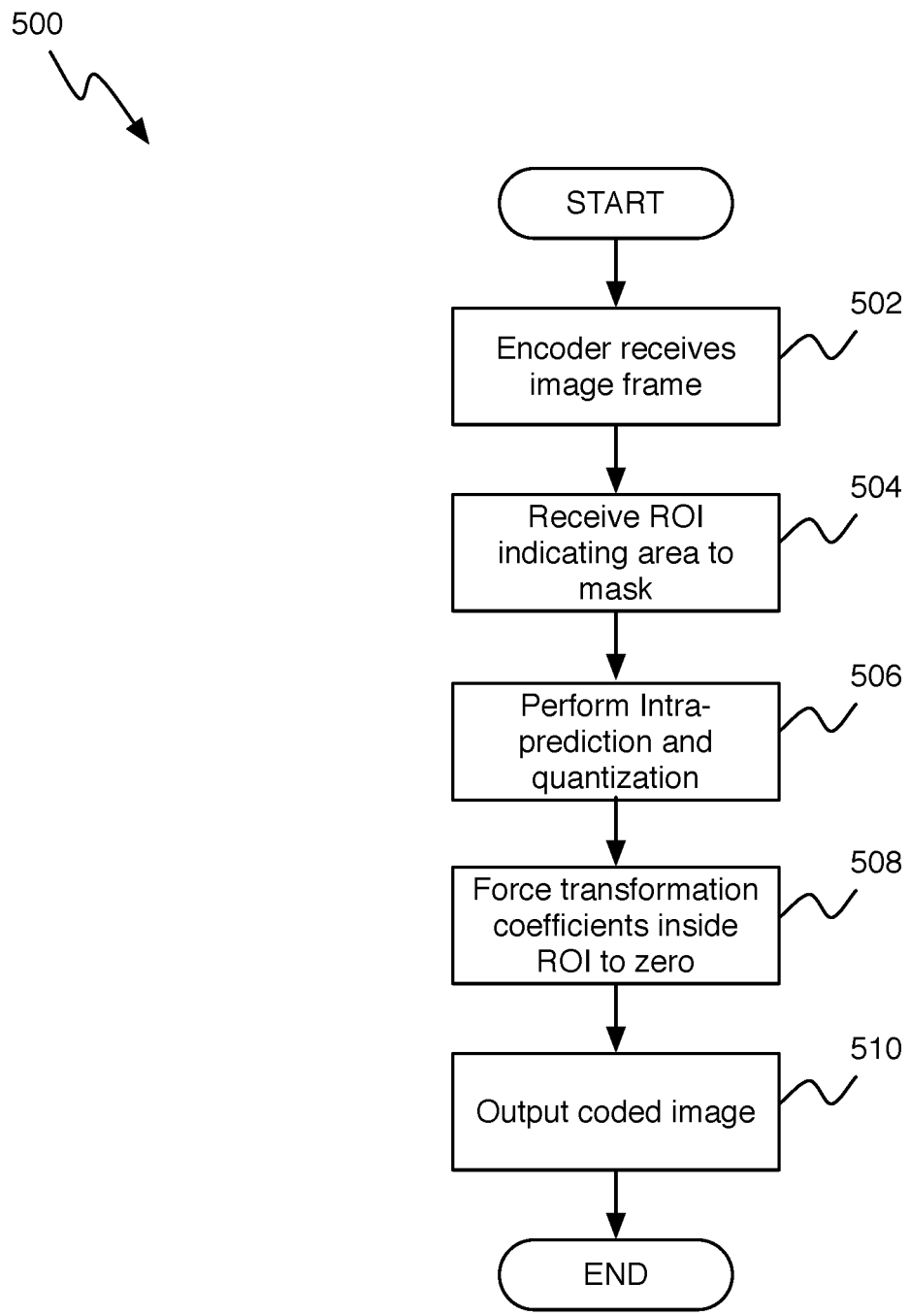
FIG. 5 shows a process for creating a privacy mask in a received video stream, in accordance with one embodiment.

As can be seen in FIG. 5, the encoder 106 receives a first image frame, step 502. An example of such an image frame is shown in FIG. 2, as discussed above. Next, the encoder receives a region of interest (ROI) that represents a region of the image that is to be masked by blurring, step 504. That is, the input specifies that certain coding units within the image frame should have better quality and some coding units should have lower quality. Generally, the amount of blurring is determined by the size of the coding units. For example, if the coding units are set to 4×4 pixels, the blurring will be less than if the coding units are set to 64×64 pixels, and will also result in smoother edges in the resulting image. It should be noted that in some embodiments, the blurring of the image can also be changed, either as an alternative or as a complement to changing the size of a coding unit, by changing the number of transformation coefficients for the coding unit. Typically, a smaller number of transformation coefficients create a larger amount of blurring, and conversely, a larger number of transformation coefficients for a coding unit result in a smaller amount of blurring.

The ROI can be provided by a user through a conventional type user interface that is familiar to those having ordinary skill in the art. Alternatively, some version of automated object detection can be used. For example, object detection algorithms can be used to automatically identify any faces in a captured image, or license plates on cars, etc. just to mention a couple of examples.

Typically, the borders of the privacy masks are adjusted to coincide with the borders of the encoding units 402, such that a privacy mask covers a certain number of whole encoding units 402. The size of the encoding units 402 can be selected automatically by the encoder 106, and is typically 4×4, 8×8, 16×16, 32×32 or 64×64 pixels when the H.265 coding scheme is used. However, in some implementations, this automatic selection of encoding unit size can be overridden manually by a user and be set to a user specified value.

Next, the encoder performs intra-prediction and quantization of the coding units in the image frame to generate a simplified representation of the image frame, step 506. These are conventional operations that are well known to those having ordinary skill in the art and will therefore not be described in any detail here.

In a conventional encoder that uses conventional coding techniques, such as H.264 or H.265, the intra-prediction and quantization steps are then followed by the application of a set of transformation coefficients to the coding units in the simplified image to add further detail to the simplified image. For example, different parts of an image may contain significantly different frequencies compared to other parts of the image, and are typically suppressed or removed in the coding step when using a conventional encoder.

However, in accordance with the masking techniques described herein, no such removal or suppression of frequencies occurs for the regions of the image that correspond to the masked areas. Instead, for any coding unit inside the identified ROI regions that represent the regions of the image to be privacy masked, the transformation coefficients are set to zero, step 508. Coding units outside the ROI have their transformation coefficients processed in a conventional way. As a result, a coded image frame is obtained in which the ROIs (i.e., the masked regions) retain the "blurriness" from the simplified image, while the regions outside the ROIs have the same appearance they would have if the image frame was processed in a conventional way.

Finally, the coded image is output, step 510, which ends the process. This process 500 is then repeated for every image in a received video sequence, thus resulting in an encoded video having a blurred privacy mask applied, and which has a much smoother appearance compared to a pixilated privacy mask.

Figure 7:
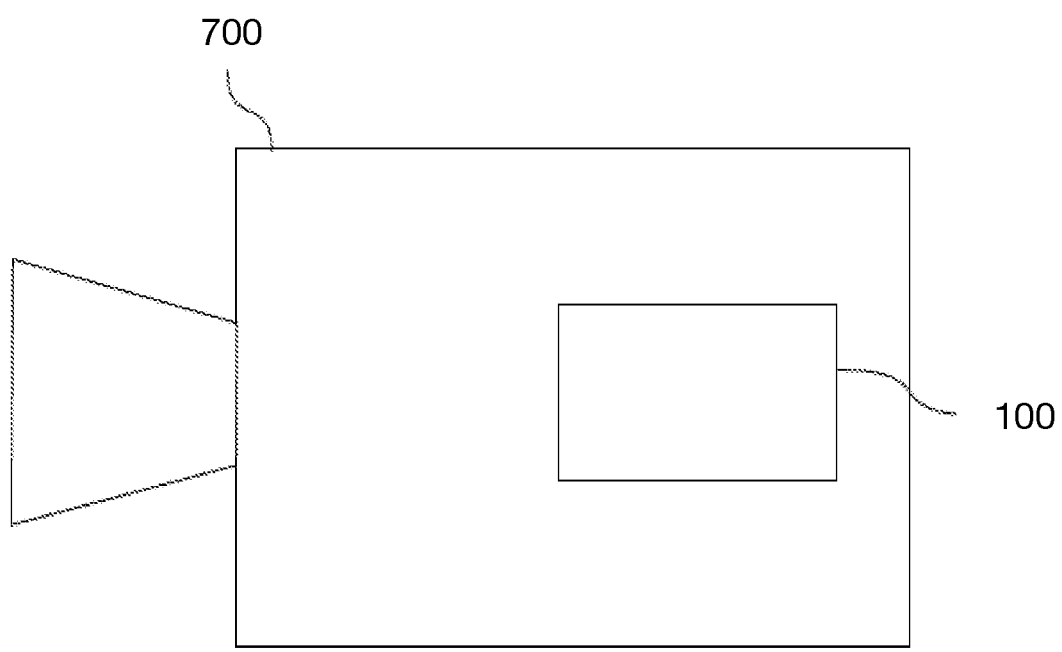
FIG. 7 shows a schematic example of a camera, in which various embodiments of the invention can be implemented.

FIG. 7 shows a camera 700 that includes a system 100, such as the one shown in FIG. 1. The camera 700 also has a number of other components, but as these are not part of the present invention, they are not shown and will not be further discussed here. The camera 700 may be any kind of camera, such as a visual light camera, an IR camera or a thermal camera.

While FIG. 7 shows the encoding system 100 of FIG. 1 being integrated in a camera 700, it is also possible realize that some parts or the entire the encoding system 100 can be arranged separately, and be operatively connected to the camera 700 through a wired or wireless connection to receive the image data of the video stream. It is also possible to transmit images from a camera 700 to, e.g., a control center without privacy masks, and to apply privacy masks in the control center, e.g., in a VMS (Video Management System). In such a case, the encoding system may be arranged in the VMS or otherwise in the control center and used for so-called transcoding, where encoded images are received from the camera, decoded and then re-encoded, but now with the privacy mask. This may be of interest if different access rights apply to different users of the images. For instance, it may be desirable to record video sequences without privacy masks for later forensic use by the police, but a guard watching live transmissions may not be authorized to see the unmasked images.

The various embodiments of the invention described herein can be used with any encoding scheme using a GOP structure with an intra-frame and subsequent inter-frames, e.g., High Efficiency Video Coding (HEVC/H.265), Versatile Video Coding (VVC), Essential Video Coding (EVC), VP9, and AV1, all of which are familiar to those having ordinary skill in the art.

The encoder is thus adapted to encode the video stream as described above. The encoder can include, or be connected to, a memory for retrieving pre-calculated motion vectors. The encoder can include a processing unit for calculating image transformations, and/or sample motion vectors from an image transformation. Alternatively, or additionally, the encoder can be adapted to receive image transformations and/or motion vectors from a separate calculation unit adapted to calculate or determine such image transformations and/or motion vectors.

The encoder typically includes one or several processing units (e.g. a CPU) for encoding the received image data as described above. The CPU can, for example, be adapted to run a software, installed from a computer-readable storage medium, with instructions adapted to carry out the encoding method of any of the above described embodiments when executed by the CPU. The encoder may further be adapted to transmit (e.g., via the Internet) the encoded video stream wireless or wired to a decoder adapted to decode the encoded video stream.

The systems (e.g., encoder) and methods disclosed herein can be implemented as software, firmware, hardware or a combination thereof. In a hardware implementation, the division of tasks between functional units or components referred to in the above description does not necessarily correspond to the division into physical units; on the contrary, one physical component can perform multiple functionalities, and one task may be carried out by several physical components in collaboration.

Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that a person skilled in the art can modify the above-described embodiments in many ways and still use the advantages of the invention as shown in the embodiments above. For example, the order of encoding the auxiliary frames and the frames complementing the auxiliary frames can be changed in any suitable way. For example, all auxiliary frames within a GOP may be encoded first, before including inter encoded frames referencing the auxiliary frames interlacing with the encoded auxiliary frames in the encoded video stream. Further, as was mentioned above, there may be situations in which different levels of blurriness may be desirable, for example, depending on a zoom level or a known distance to a masked object (e.g., as the object moves towards or away from the camera). Such situations can be accommodated by dynamically changing the size of the coding units, in accordance with the various embodiments described herein. Thus, the invention should not be limited to the shown embodiments but should only be defined by the appended claims. Additionally, as the skilled person understands, the shown embodiments may be combined.

What is claimed is:

1. A method for encoding a video sequence comprising a plurality of image frames, by an encoder, the method comprising:
   receiving an image frame from a video stream;
   receiving an input indicating one or more regions in the received image frame for which a privacy mask should be applied, wherein the one or more regions are represented by one or more coding units;
   generating a simplified representation of the image frame by performing intra-prediction and quantization of the one or more coding units; and
   encoding the image frame into an output frame, wherein a transformation coefficient for the one or more coding units is set to zero, thereby replacing the one or more coding units with corresponding untransformed coding units from the simplified representation of the image frame, in the output frame.

2. The method of claim 1, further comprising:
   selecting a size of the coding units automatically by the encoder.

3. The method of claim 1, further comprising:
   selecting a size of the coding units manually by a user.

4. The method of claim 1, wherein a size of the coding units is selected based on a desired blurriness level, and wherein the size of the coding units and the desired blurriness level correspond to those of the simplified representation of the image frame.

5. The method of claim 1, wherein the one or more regions in the received image frame for which a privacy mask should be applied are automatically identified using object detection techniques.

6. The method of claim 1, wherein the video is encoded in one of the following formats: High Efficiency Image File Format, Advanced Video Coding, High Efficiency Video Coding, H.265, H.266, VP9, VP10 and AV1.

7. An encoder system for encoding a video sequence comprising a plurality of image frames, comprising:

a receiving module configured to:
- receive an image frame from a video stream,
- receive an input indicating one or more regions in the received image frame for which a privacy mask should be applied, wherein the one or more regions are represented by one or more coding units, and
- generate a simplified representation of the image frame by performing intra-prediction and quantization of the one or more coding units; and an encoder configured to:
- encode the image frame into an output frame, wherein a transformation coefficient for the one or more coding is set to zero, thereby replacing the one or more coding units with corresponding untransformed coding units from the simplified representation of the image frame, in the output frame.

8. The encoder system of claim 7, wherein encoder is further configured to automatically select a size of the coding units.

9. The encoder system of claim 7, wherein a size of the coding units is selected based on a desired blurriness-level, and wherein the size of the coding units and the desired blurriness level correspond to those of the simplified representation of the image frame.

10. A computer program product for encoding a video sequence comprising a plurality of image frames, the computer program product comprising a non-transitory computer readable storage medium having program instructions embodied therewith, the program instructions being executable by a processor to cause the processor to perform a method comprising:
- receiving an image frame from a video stream;
- receiving an input indicating one or more regions in the received image frame for which a privacy mask should be applied, wherein the one or more regions are represented by one or more coding units
- generating a simplified representation of the image frame by performing intra-prediction and quantization of the one or more coding units; and
- encoding the image frame into an output frame, wherein a transformation coefficient for the one or more coding units is set to zero, thereby replacing the one or more coding units with corresponding untransformed coding units from the simplified representation of the image frame, in the output frame.

11. The computer program product of claim 10, wherein a size of the coding units is selected based on a desired blurriness-level, and wherein the size of the coding units and the desired blurriness level correspond to those of the simplified representation of the image frame.

* * * * *